(12) United States Patent
Depeige (10) Patent No.: US 9,199,714 B2
(45) Date of Patent: Dec. 1, 2015

(54) INTERCONNECTION DEVICE CONNECTING AN AIRCRAFT INTERNAL STRUCTURE COMPONENT TO THE FUSELAGE OF THIS AIRCRAFT

(75) Inventor: Alain Depeige, Tournefeuille (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 800 days.

(21) Appl. No.: 12/739,054

(22) PCT Filed: Nov. 14, 2008

(86) PCT No.: PCT/FR2008/001605
§ 371 (c)(1),
(2), (4) Date: Apr. 21, 2010

(87) PCT Pub. No.: WO2009/098374
PCT Pub. Date: Aug. 13, 2009

(65) Prior Publication Data
US 2010/0308172 A1    Dec. 9, 2010

(30) Foreign Application Priority Data
Nov. 16, 2007 (FR) ...................................... 07 59126

(51) Int. Cl.
*B64C 1/06* (2006.01)
*B64C 1/12* (2006.01)
*B64C 1/14* (2006.01)

(52) U.S. Cl.
CPC . *B64C 1/062* (2013.01); *B64C 1/12* (2013.01); *B64C 1/1461* (2013.01)

(58) Field of Classification Search
CPC ........ B64C 1/062; B64C 1/12; B64C 1/1461; B64C 1/1407; B64C 1/068; B60R 21/0428; B60R 21/045; B60R 19/18; B60R 2021/0051; B60R 2021/0414
USPC ........... 244/129.5, 132, 117 R, 119; 280/748, 280/751, 752; 296/146.11, 146.6, 146.7, 296/208
See application file for complete search history.

(56) References Cited

U.S. PATENT DOCUMENTS

| 2,665,459 | A | * | 1/1954 | Lee ............................... 49/483.1 |
| 3,930,665 | A | * | 1/1976 | Ikawa ........................... 280/751 |
| 4,290,235 | A | * | 9/1981 | Jahnle et al. .................... 49/502 |
| 4,593,870 | A | | 6/1986 | Cronkhite et al. |
| 5,040,335 | A | * | 8/1991 | Grimes ........................... 49/502 |
| 5,096,223 | A | * | 3/1992 | Tekelly et al. ................ 280/748 |

(Continued)

FOREIGN PATENT DOCUMENTS

| EP | 0 009 654 | 4/1980 |
| EP | 1 813 527 | 8/2007 |

(Continued)

*Primary Examiner* — Valentina Xavier
(74) *Attorney, Agent, or Firm* — Oblon, McClelland, Maier & Neustadt, L.L.P.

(57) ABSTRACT

An aircraft including at least one door for passengers to board the aircraft, and at least one interconnection device connecting an aircraft internal structure component and a skin of a fuselage of the aircraft, the interconnection device being positioned near an internal periphery of the door in a region subject to external knocks and including at least one region that is weakened in terms of compression so as to absorb the knocks experienced by an external face of the skin of the fuselage, the device also being configured to withstand tensile forces applies to an internal face of the skin of the fuselage by internal pressure inside the aircraft.

19 Claims, 4 Drawing Sheets

(56) References Cited

U.S. PATENT DOCUMENTS

| | | | |
|---|---|---|---|
| 5,171,510 A * | 12/1992 | Barquet et al. | 264/258 |
| 5,549,327 A * | 8/1996 | Rusche et al. | 280/751 |
| 6,059,230 A * | 5/2000 | Leggett et al. | 244/129.5 |
| 6,196,619 B1 * | 3/2001 | Townsend et al. | 296/146.6 |
| 6,361,092 B1 * | 3/2002 | Eagle et al. | 293/102 |
| 6,568,637 B2 * | 5/2003 | Bluem et al. | 244/129.5 |
| 7,338,075 B2 * | 3/2008 | Ellison et al. | 280/752 |
| 7,431,338 B2 * | 10/2008 | Hayata | 280/752 |
| 7,441,806 B2 * | 10/2008 | Ellison | 280/752 |
| 7,677,640 B2 * | 3/2010 | Dix et al. | 296/146.7 |
| 8,146,863 B2 * | 4/2012 | Larcher | 244/129.5 |
| 8,317,240 B2 * | 11/2012 | Muller et al. | 293/132 |
| 2004/0040252 A1 | 3/2004 | Beral et al. | |
| 2004/0231937 A1 | 11/2004 | Goodworth et al. | |
| 2007/0046010 A1 * | 3/2007 | Haba et al. | 280/751 |
| 2008/0023583 A1 | 1/2008 | Payen | |
| 2009/0113954 A1 | 5/2009 | De Resseguier et al. | |
| 2009/0308977 A1 * | 12/2009 | Larcher | 244/129.5 |

FOREIGN PATENT DOCUMENTS

| | | |
|---|---|---|
| FR | 2904602 A1 * | 2/2008 |
| WO | 2007 107861 | 9/2007 |

* cited by examiner

INTERCONNECTION DEVICE CONNECTING AN AIRCRAFT INTERNAL STRUCTURE COMPONENT TO THE FUSELAGE OF THIS AIRCRAFT

The invention relates to a device for connection between an internal structural part of an aircraft and a fuselage skin of the aircraft.

Aircraft fuselages generally are made of a fuselage skin reinforced by structural parts such as longitudinal stiffeners (stringers) and transverse stiffeners (frames). The longitudinal stiffeners are connected to the skin by various assembly techniques: welding, riveting . . . .

As for the transverse stiffeners, they are connected to the skin by means of clamps.

When the aircraft are on the ground, they can sustain damage from their external environment.

Thus, for example, the runway vehicles that hover around the aircraft, such as the on-board catering service loading trucks or the pallet transporters, can cause impacts to the fuselages of the aircraft.

The same is true for the airport installations such as the walkways for boarding and deplaning.

Most of the impacts are caused in the peripheral environment near the cabin doors, generally in a peripheral zone of the fuselage of approximately three meters around the doors.

When the skin of the fuselage of the aircraft is basically metal (aluminum alloy which generally is ductile), external impacts sustained by the skin of the fuselage leave marks that take on the appearance of local clefts.

The occurrence of these defects visible from the outside makes it necessary to undertake extensive visual inspections of the exterior and the interior, removing the outfitting and the internal insulation.

Alternatively, non-destructive inspection operations, such as the search for cracks by using the method known as Foucault currents, can be undertaken in order to ascertain whether the impacts have caused other damage not visible to the naked eye.

When the skin of the fuselage of the aircraft is made of composite materials, such as plastics reinforced with carbon fibers, the impacts sustained by the skin do not necessarily leave outside marks.

The impacts, however, can give rise to delaminations between the various layers of the composite covering constituting the skin. The layers thus are separated, which reduces the resistance to compression and to shearing of the skin.

This phenomenon even can cause a rupture of the structural parts fastened to the skin (frames and stringers, for example).

The patent FR 2 666 895 describes a method that makes it possible to memorize and to detect an impact sustained by a part made of carbon-based composite material.

Although it is very satisfactory, this method does not make it possible, however, to prevent an impact sustained by the skin of the fuselage from affecting the structural elements adjacent to the skin.

This invention seeks to prevent, or in any case to limit, the effect of the impact on the structural parts adjacent to the skin of the fuselage.

To this end, the invention has as an object an aircraft comprising at least one door for the boarding of passengers into the aircraft, characterized in that it comprises at least one device for connection between an internal structural part of an aircraft and a skin of the fuselage of the aircraft, the connection device being positioned near the inner periphery of the door in a zone subject to outside impacts and comprising at least one zone weakened under compression in order to absorb impacts sustained by the outer face of the skin of the fuselage, the device furthermore being configured to resist the tensile stresses exerted on the inner face of the skin of the fuselage by the internal pressure of the aircraft.

In this way, in the event of outside impact sustained by the skin of the fuselage, the weakened zone or zones of the device serve as fuses and break so as to prevent the external compressive stresses exerted on the fuselage from spreading to the adjacent structure and damaging it.

When a part (e.g.: frame) of the structure is damaged, its repair can be burdensome in terms of time and cost and necessitate downtime for the aircraft. This invention makes it possible to be free of this inconvenience, since it suffices to replace the connection device or devices that have been sacrificed.

It will be noted that the zone is weakened under axial compression along an axis more or less perpendicular to the skin of the aircraft.

According to one characteristic, the device comprises two elements at least one of which contains the said at least one zone weakened under compression.

More particularly, the device comprises a first element containing the said at least one zone weakened under compression and a second element configured to resist tensile stresses.

In this way, the functions of weakened hold-up under compression and tensile strength are separated and each provided by a different element.

According to an alternative characteristic, each of the two elements of the device contains the said at least one zone weakened under compression and is configured to resist tensile stresses.

In this way, both functions are provided by each element.

It will be noted that the device may comprise more than two elements. In this case, the zone or zones for absorption of energy may be on one or more of these elements.

According to one characteristic, the device comprises a single element that contains the said at least one zone weakened under compression and is configured to resist tensile stresses.

This device therefore is simpler to install than a device with two or more than two elements.

In order to weaken the hold-up under compression of the element or elements constituting this device, several holes or perforations are implemented in the device and, for example, in one or more elements thereof.

This elimination of material generally is implemented in the thickness of the element or elements, the thickness being taken along a direction perpendicular to the axial direction of compression.

According to one characteristic, the device comprises one or more stabilizers for the internal structure in order to prevent a swaying motion thereof.

This stabilization function has as a purpose to counteract the natural tendency of the internal structural elements (frames, stringers . . . ) to give way under the action of an external stressing.

More particularly, the device comprises a first end part intended to be affixed to the skin of the fuselage, a second end part intended to be affixed to the internal structural part, and a third intermediate part connected to the other two and containing the said at least one zone weakened under axial compression.

These parts may be located on each of the two aforementioned elements or on only one of them, depending on whether the device comprises two elements or only one.

When it comprises two elements, the three parts are not necessarily on both elements.

According to one characteristic, the first end part extends in a first direction parallel to the inner face of the skin of the fuselage and the second end part extends in a second direction perpendicular to the first direction.

According to another characteristic, the third intermediate part may extend in a direction more or less parallel to the second direction or in several directions (when this third part is made up of several portions) more or less parallel to the second direction or oblique in relation to the latter.

It will be pointed out that the second direction corresponds to the axial direction along which the zone or zones of the device are formed in order to have an intentionally reduced axial compression resistance.

It will be noted furthermore that the tensile hold-up of the device generally is ensured by an appropriate thickness of the stressed part of the device.

The device thus has the general shape of an angle-iron interlocking parts of an internal structure with the skin of the fuselage of the aircraft.

The shape of the angle-iron seen along its thickness may vary depending on the different embodiments and functionalities attributed to the element or elements making up the device.

It will be noted that the device more particularly is positioned in a zone bordering the opening closed off by the door and which is likely to sustain impacts during approach movements of the boarding and deplaning walkways.

Other characteristics and advantages will become apparent in the course of the description that is going to follow, provided only by way of non-limitative example and presented with reference to the attached drawings on which.

Figure 1:
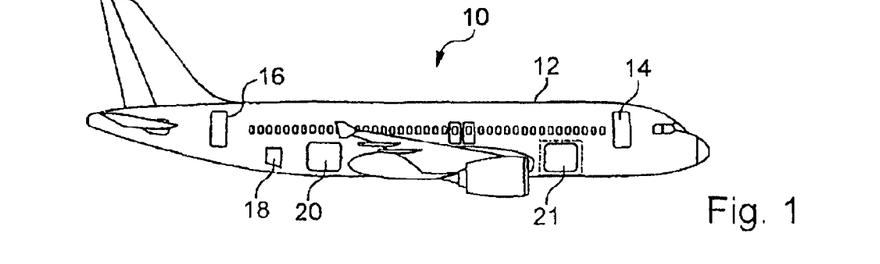
FIG. 1 is a general schematic view of an aircraft.

As shown on FIG. 1 and designated by the general reference marked 10, an aircraft comprises a fuselage 12 and several on-board access doors and panels 14, 16, 18, 20, 21.

The invention applies in particular to aircraft doors through which the passengers and the on-board personnel enter and leave the aircraft, as well as to the other doors or panels for opening/closing (palletized holds, bulk-cargo holds . . . ) through which baggage, freight, foodstuffs, are introduced on board.

These various doors and panels are likely to be damaged when the aircraft is on the ground.

In fact, the airport equipment items and installations for loading and unloading of holds and boarding and deplaning of persons may bump against the fuselage of the aircraft during approach maneuvers.

The bumped zones are those bordering the doors, panels, hatchways . . . for on-board access.

Figure 2A:
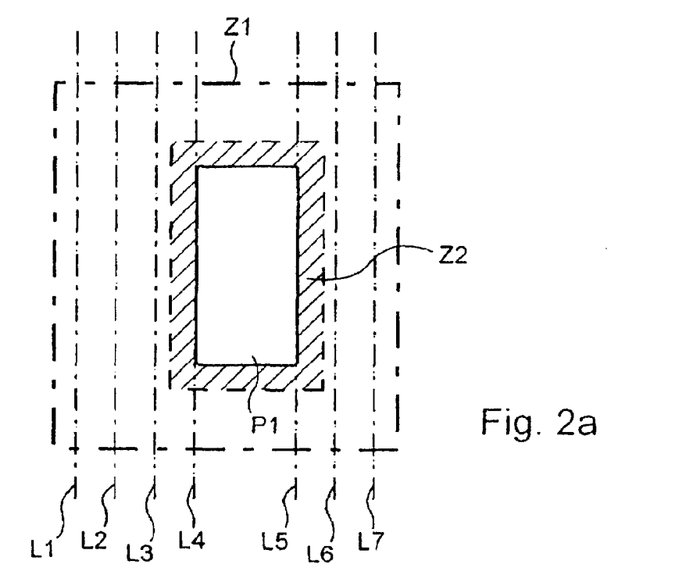
FIG. 2*a* is a general schematic view of a door for passengers of an aircraft.

On FIG. 2*a*, an on-board access door P1 for passengers has been shown and, in dashed lines, a surrounding zone Z1 which is likely to receive impacts from the equipment items/installations on the ground. This zone is devoted to the approach of the walkways and is defined by the standard ISO-DIS 7718.

In zone Z1, the mixed vertical lines L1, L2, L3, L4, L5, L6, L7 located on both sides of the opening of door P1 (the front of the airplane is to the left of the door) show the positions along which stiffening frames (structural parts or elements inside the aircraft and stiffening the fuselage) are arranged.

These various positions are spaced two by two at a distance generally ranging between 500 and 635 mm.

Zone Z1 has a height generally on the order of 3500 mm and a length of approximately 4500 mm.

A second zone Z2 immediately bordering the door is reinforced in known manner by frames directly affixed to the skin of the fuselage.

The connection device according to the invention may be affixed along positions L1 to L7 outside zone Z2, that is to say laterally in relation to this zone, above and below the latter. Several devices are, for example, arranged along the height of zone Z1, at a generally uniform distance from each other.

Figure 2B:
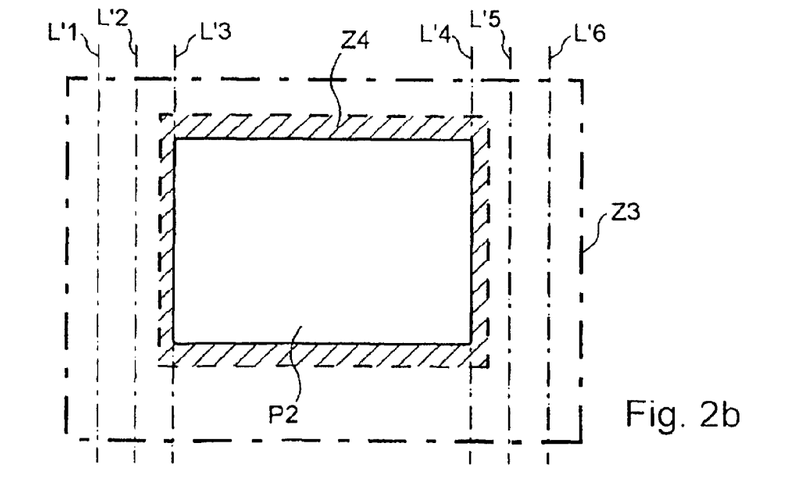
FIG. 2*b* is a general schematic view of a cargo door of an aircraft.

On FIG. 2*b*, a hold access door/panel P2 (the front of the airplane is to the right of the door) and, in dashed lines, a zone Z3 surrounding this door and which is likely to receive impacts from the airport equipment items/installations, have been shown. Zone Z3 is devoted to the approach of the pallet transporters.

Door P2 corresponds, for example, to door 21 of FIG. 1.

In zone Z3, the mixed vertical lines L'1, L'2, L'3, L'4, L'5, L'6 situated on both sides of the opening of door P2, show the positions along which the stiffening frames are arranged.

A second zone Z4 located at the immediate periphery of the door (like zone Z2 of FIG. 2*a*) is reinforced by frames directly affixed on the skin of the fuselage.

There also, the device according to the invention can be arranged along positions L'1 to L'6 outside the peripheral zone Z4.

Figure 3A:
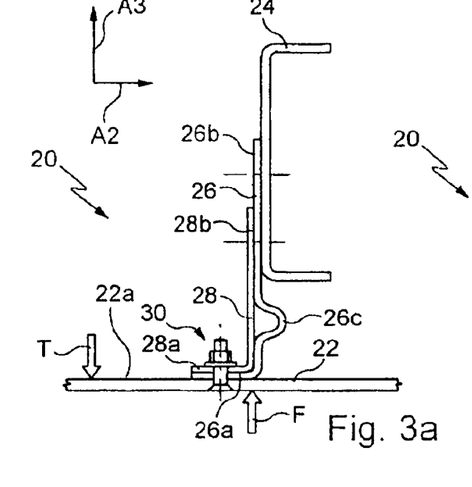
FIG. 3*a* is a general schematic view of an embodiment of a device according to the invention.
Figure 3B:
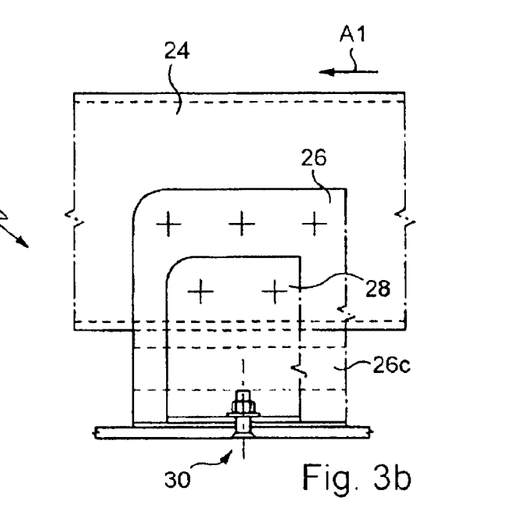
FIG. 3*b* is a side view of the device of FIG. 3*a*.

The device or clamp 20 illustrated schematically on FIGS. 3*a* and 3*b* is, for example, introduced into the non-reinforced approach zones shown on FIGS. 2*a* and 2*b*.

This device connects the reinforcement parts of an internal structure of the aircraft to the skin or wall 22 of the fuselage.

In particular, the reinforcement part of FIGS. 3*a* and 3*b* is a frame 24 serving as a transverse stiffener and of which only the open C shape is seen in cross-section (FIG. 3*a*). The body of the frame extends longitudinally along the direction A1 (FIG. 3*b*).

In the reference for these FIGS. 1 and 2, direction A1 corresponds to the vertical.

Device 20 comprises two separate elements 26 and 28 placed side by side, each having a general square or inverted L shape in cross-section so as to be able to be easily affixed on the one hand to frame 24 and to wall 22 and, on the other hand, to one another.

Each element 26, 28 thus comprises a first end part 26*a*, 28*a* that extends in a direction A2 parallel to the inner face 22*a* of the fuselage skin 22 in order to be affixed thereto.

More particularly, first part 26*a* of first element 26 is in contact via its outer face with inner face 22*a*, while first part 28*a* of second element 28 is positioned against the inner face of first part 26*a*.

A standard fastening means 30, for example of the screw-nut type, assembles both elements with the skin 22.

It will be noted that the skin of the fuselage can be made of composite (carbon . . . ) or metal materials.

Each element 26, 28 also contains a second part 26b, 28b that extends overall in a direction A3, perpendicular to the direction A2, so as to be able to be affixed to the body of the frame 24, in particular on its large longitudinal outer face.

More particularly, the second part 26b of element 26 is in contact via its outer face with the longitudinal outer face of frame 24 and is affixed thereto, for example, by mechanical fastenings such as bolts, rivets, or by gluing.

Second part 28b of element 28 is in contact via a so-called end portion of its outer face with the inner face of second part 26b and is affixed thereto, for example, by mechanical fastenings such as bolts, rivets, or by gluing.

First element 26 also comprises a third intermediate part containing a zone 26c weakened under compression. This zone is in the form of a bend or undulation extending in direction A3, perpendicular in relation to the axial direction of compression (direction A2).

This bend 26c extends longitudinally (along direction A1) over a large part of the length of element 26, or even over its entirety (FIG. 3b).

By reason of this pre-buckled form that offers little resistance to an external stress under axial compression (illustrated by the arrow referenced F), first element 26 is going to collapse and break under the action of such a stress (impact), thus performing a function of fuse or energy absorber.

As for second element 28, it is configured to resist the tensile stresses induced by the pressure prevailing inside the cabin (illustrated by the arrow referenced T). To accomplish this, its dimensions (length, thickness) are adapted.

It will be noted that, in this embodiment, second element 28 also is weakened under compression by reason of its small thickness (dimension taken along a cross-section).

The thickness of the second element, however, is adapted so as not to offer a compressive strength exceeding that of the first element.

In this way, in the event of axial impact on skin 22 (arrow F), element 28 in the form of a straight angle-iron is going to break first, while element 26 in the form of an undulating angle-iron is going to absorb the energy of the impact by becoming deformed in order to protect the internal structure 24 adjacent to the wall and connected thereto.

It will be noted that it is helpful to understand that the connection clamp (device 20) has fulfilled its function and has broken.

To accomplish this, a detection means of the "fuse wire" or stress gauge type is integrated into the clamp or affixed thereto. This means is associated with one and/or the other of the elements making up the clamp and is subject to the deformation to which these elements are subject.

The means thus is going to become deformed until its rupture (produced for the maximum deformation sustained by the clamp), which is going to trigger the sending of a signal to a maintenance computer (computer monitoring system of the aircraft) placed on board the aircraft. The document FR 2 666 895 describes a method for impact detection that can be used in the example mentioned above.

Furthermore, the two elements or parts of device 20 are, for example, made of composite materials.

Alternatively, they could be made of metal materials such as light metal alloys protected from galvanic corrosion by an appropriate coating.

By way of example, these elements are made of titanium and the thickness of each of them is determined according to the stresses to which these elements are subject during their use (current stresses and stresses leading to a deformation).

It will be noted that the first element can be weakened by other methods such as perforations implemented in the thickness of the element.

The first element also could be made in two portions forming an angle of inclination with one another and the joining zone between the two portions could be thinned out in order to offer a lesser resistance to axial compressions.

By way of example, frame 24 has a height of approximately 85 mm and the length of device 20 in the longitudinal direction A1 is, for example, 150 mm.

Figure 4A:
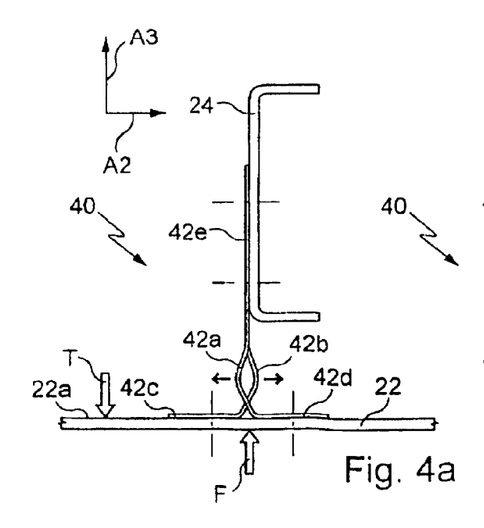
FIG. 4*a* is a general schematic view of another embodiment of a device according to the invention.
Figure 4B:
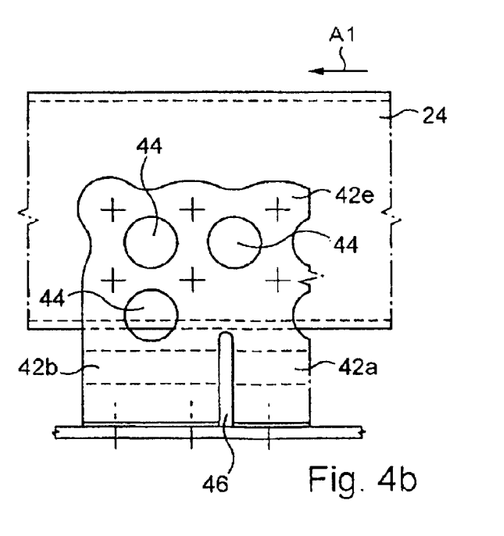
FIG. 4*b* is a side view of the device of FIG. 4*a*.

Device 40 illustrated schematically on FIGS. 4a and 4b holds in position a structural element (frame 24) adjacently associated with the skin of the fuselage 22 by virtue of a single connection element.

The sole connection element provides at once a function of mechanical resistance to tensile stresses, which is adapted for resisting current stresses, and a function of weak mechanical resistance under axial compression.

This element has a general reversed-T shape in cross-section (plane of FIG. 4a) and extends longitudinally along direction A1 (FIG. 4b).

Element 40 can be seen as the combination of two sub-elements in the form of inverted undulating angle-irons, arranged one behind the other along direction A1, one having a general L shape and the other a general inverted L shape.

Each sub-element the general shape of which is close to that of element 26 of FIGS. 3a and 3b has a bent or curved median part (intermediate part) so as to have a pre-buckling feature with regard to an external axial stress (F). The two bent median parts 42a and 42b have concavities opposite one another and are prolonged by flat parts forming sole-pieces 42c and 42d (end parts) respectively, affixed to inner face 22a of the skin 22 by mechanical fastenings (rivets or bolts) or by gluing.

Each assembly made up of a bent median part and a sole-piece forms a strut.

These sub-elements are joined at their upper part 42e (FIG. 4b) so as to form only one part.

The upper part in a way forms a common body or trunk to which the struts are attached.

Upper part 42e (end part) is affixed to the longitudinal outer face of frame 24 by fastening means such as mechanical fastenings (rivets or bolts) or by gluing.

This upper part optionally has holes or perforations 44 in its thickness so as to weaken its resistance under axial compression.

The contour of the lightened upper part 42e possibly comprises undulations or scallops so as to slightly reduce the mass of the part and therefore the weight taken on board.

Moreover, a slot 46 aligned along direction A3 is provided between the two bent struts 42a and 42c on the one hand, and 42b, 42d on the other hand, so as to further reduce the hold-up under compression of device 40 and to impart thereto an additional flexibility/elasticity.

In this way, connection device 40 is weakened under compression by virtue of bent portions 42a, 42b of its two struts and possible holes 44 so as to absorb the energy of an axial impact and therefore protect frame 24.

In this embodiment, the resistance of device 40 to tensile stresses T is obtained through its thickness which is greater than that of element 28 (straight angle-iron) of FIG. 3a.

It is sought, therefore, to reduce the weight of the device by the lightening holes and peripheral scallops to compensate for an extra thickness.

It will be noted that the device may comprise more than two consecutive struts bent alternately forward and backward, separated from each other by a slot and fastened to body 42e.

In this embodiment, one or more rupture detection means of the type of those described in relation to FIGS. 3a, 3b may be associated with device 40.

Figure 5:
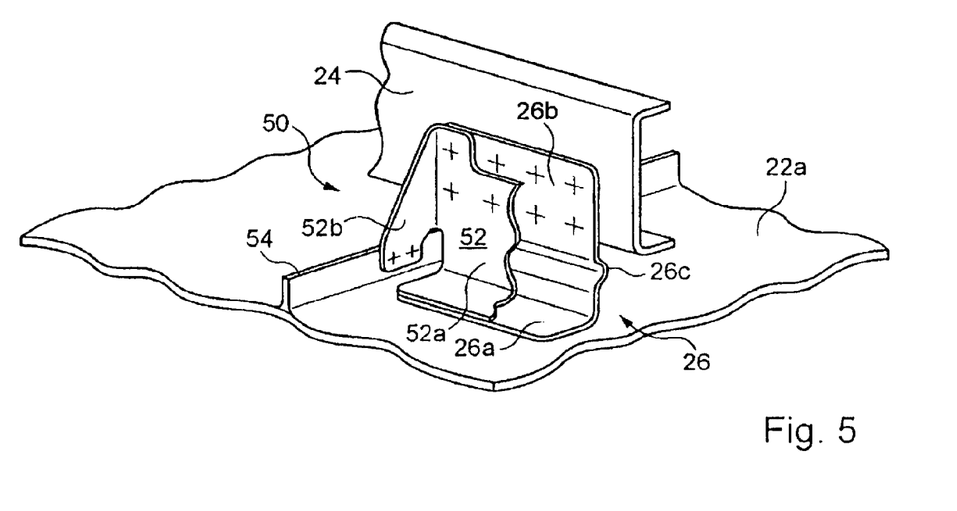
FIG. 5 is a schematic view in perspective of an embodiment variant of the device of FIGS. 3*a* and 3*b*.

FIG. 5 illustrates an embodiment variant of device 20 of FIGS. 3a and 3b.

In this variant, the first element weakened under compression of connection device 50 is identical to first element 26 (in the form of an undulating angle-iron) and retains the same reference.

Second element 52 of device 50 integrates a functionality additional to that (tensile hold-up) provided by second element 28 of device 20.

This second element 52 comprises a part 52a almost identical to second element 28 (in the form of a straight angle-iron) and that comes to be superposed on the large inner face of first element 26.

Second element 52 also comprises a stabilization part 52b that extends perpendicular to the large face of part 52a and therefore perpendicular to frame 24 (in a cross-section). This transverse extension has the effect of countering the transverse swaying (tilting) of frame 24 in the direction of skin 22, when it is subject to current stresses.

It will be noted that this extension is implemented in the form of a return of the second element (obtained by bending) that extends from the high part of the second element to its lower part in contact with a stringer 54 integral with wall 22.

The stabilizer formed in this way creates a brace for the frame by connecting it to a stringer by means of mechanical fastenings (bolts or rivets).

The stabilizer has a general triangular or trapezoidal shape and is affixed to the stringer with at least two fastenings.

Figure 6:
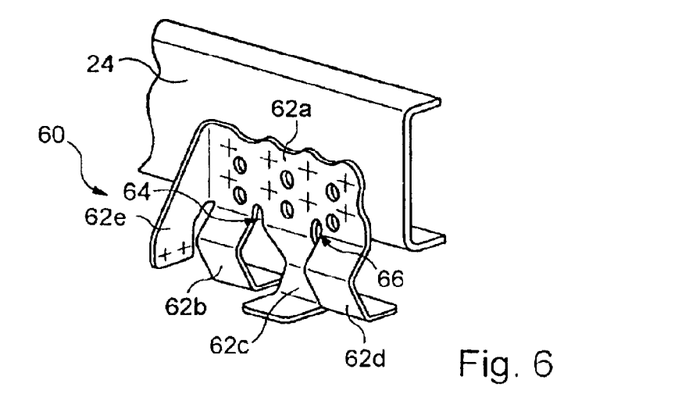
FIG. 6 is a schematic view in perspective of an embodiment variant of the device of FIGS. 4*a* and 4*b*.

FIG. 6 illustrates an embodiment variant of device 40 of FIGS. 4a and 4b integrating a structural stabilizer analogous to that shown on FIG. 5.

In this variant, connection device 60 comprises a body 62a affixed to frame 24 and possibly drilled with openings like body 42e of FIG. 4b.

Three bent struts 62b, 62c ad 62d are attached to body 62a, successively alternating a concavity now oriented toward the front, now toward the rear, like the bent struts of FIGS. 4a, 4b.

The three struts 62b, 62c and 62d are spaced longitudinally two by two with a respective slot 64, 66, The stabilization function is provided by a perpendicular return 62e analogous to the return of stabilizer 52b of FIG. 5.

Figure 7A:
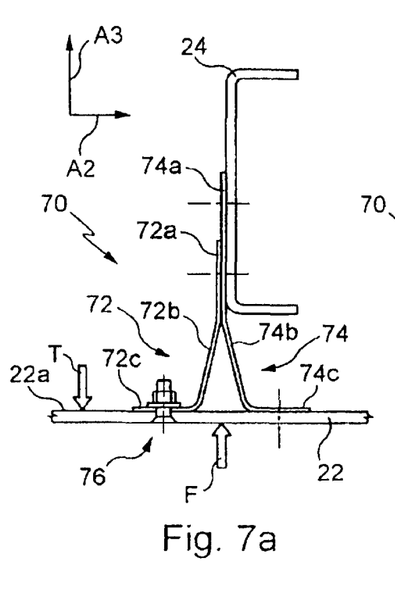
FIGS. 7*a*, 7*b* and 7*c* are schematic views in cross-section, from the side and in perspective, respectively, of another embodiment of a device according to the invention.
Figure 7B:
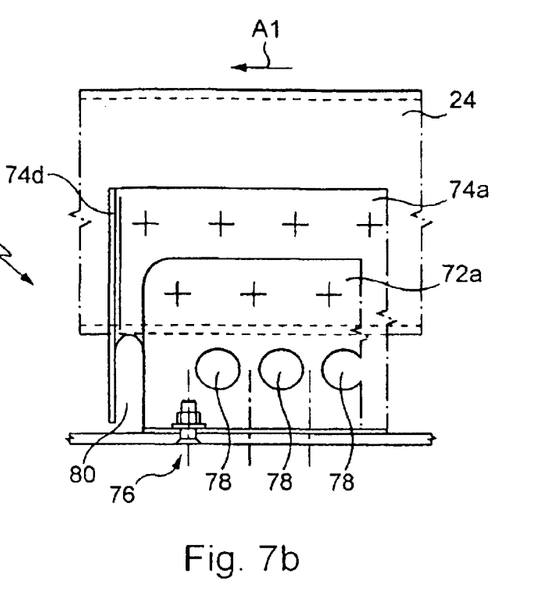
Figure 7C:
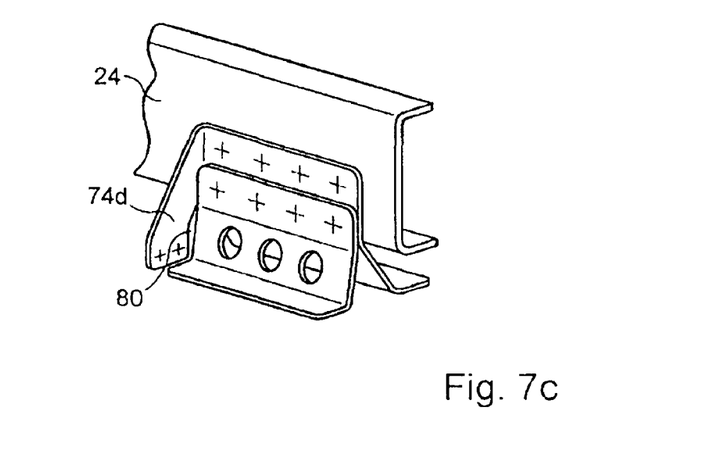

Device 70 shown on FIGS. 7a, 7b and 7c illustrates a third embodiment of the invention. This device is made up of two elements 72, 74 resting on one another, affixed to the internal structure 24 of the aircraft, on the one hand, and to the wall 22, on the other hand.

Each element 72, 74, comprises a part 72a, 74a that extends in a plane formed by directions A1 and A3, so as to be able to be affixed on the body of frame 24, in particular on its large longitudinal outer face.

The two respective parts 72a, 74a form the body of the element concerned and are affixed to one another, for example, by bolting or riveting. As for part 74a, it is affixed directly to structural element 24.

Each element 72, 74 also comprises a median part 72b, 74b inclined in relation to the plane formed by directions A1 and A3 and which extends, respectively, from part 72a, 74a in the direction of wall 22 of the fuselage.

A plane part forming base 72c, 74c extends from inclined part 72b, 74b parallel to skin 22 and is in contact therewith to be attached there through fastening means such as means 76 (similar to means 30 of FIG. 3a).

Median parts 72b, 74b constitute the cores of clamp 70, just like the bent parts 42a, 42b of clamp 40. Nonetheless, they have more tensile stability than the latter, because they can be stretched by symmetrical oblique stresses in relation to the median plane located between parts 72b and 74b.

Median parts 72b, 74b that extend obliquely in relation to the axial direction of compression (F) are weakened under compression by the presence of several lightening holes 78.

These holes implemented in the thickness of elements 72, 74 are more or less aligned along longitudinal direction A1.

It will be noted that the implementation of holes with a view to reducing the resistance to compression of the connection device according to the invention (FIGS. 4b, 6 and 7b) is a particularly simple means to use.

Other means for removal of material are conceivable, for example by implementing appropriate cut-outs in the element or elements making up the device.

In this way, each element 72, 74 is at once configured to have a sufficient resistance to tensile stresses (through its thickness) and a weakening with regard to axial compression stresses (along F).

It will be noted that element 72 is, just like element 28 of FIGS. 3a and 3b, of reduced dimensions in relation to those of element 74, this in order to minimize the overlapping of the cores of parts 24, 74, 72 and in this way to reduce the mass. Part 74a may require, as on the example, several fastening lines according to the passing stress flow.

Furthermore, the thickness of element 72 is less than or equal to that of element 74 because part 74 connected by more fastenings will have more stress to transmit.

As shown on FIGS. 7b and 7c, a return 74d formed by bending at a right angle from element 74 extends transversely along directions A2 and A3. This return has the function of stabilizing frame 24 in the event of swaying toward the left and in the direction of skin 22 (FIG. 7a).

This return has a shape and a function analogous to those of the returns of FIGS. 5 and 6.

A cut-out 80 furthermore is provided between element 72 and stabilizer 74d in order to allow bending in two directions (bending of the stabilizer and bending of element 74) and to avoid release of the adjacent stringer base.

It should be noted that the connection device/clamp according to the invention can take on different forms not shown here, to the extent that each of these forms provides an intentional weakening under compression and a sufficient mechanical tensile hold-up.

The device according to the invention can be used in zones of the aircraft where impacts from the outside are likely to damage the wall of the aircraft as well as internal elements installed adjacent to this wall.

The invention claimed is:

1. An aircraft comprising:
a door in a fuselage of the aircraft, the door being surrounded by a surrounding zone of the fuselage;
a first frame of the fuselage that extends transverse to a longitudinal direction of the aircraft; and
a connection device located between the first frame of the fuselage of the aircraft and a skin of the fuselage of the aircraft, the connection device being positioned in the surrounding zone, which is a zone subject to external impacts, and the connection device includes a first end part configured to be affixed to the fuselage skin, a second end part configured to be affixed to the first frame, and a third part that is located in between the first end part and the second end part and includes at least one zone configured to be weakened under compression to absorb an impact sustained by an outer face of the skin of the fuselage the at least one zone collapsing and breaking in response to the impact, the connection device further configured to resist tensile stresses exerted on an inner face of the skin of the fuselage by internal pressure of the aircraft.

2. An aircraft according to claim 1, wherein the connection device comprises two elements at least one of which includes the at least one zone weakened under compression.

3. An aircraft according to claim 2, wherein the connection device comprises a first element including the at least one zone weakened under compression and a second element configured to resist tensile stresses.

4. An aircraft according to claim 2, wherein the connection device comprises two elements that each include the at least one zone weakened under compression and are configured to resist tensile stresses.

5. An aircraft according to claim 1, wherein the connection device comprises a single element that includes the at least one zone weakened under compression and is configured to resist tensile stresses.

6. An aircraft according to claim 1, further comprising lightening holes implemented in the device so as to weaken its hold-up under compression.

7. An aircraft according to claim 1, further comprising at least one stabilizer of the first frame so as to prevent a swaying movement thereof.

8. An aircraft according to claim 1, wherein the at least one zone is weakened under axial compression.

9. An aircraft according to claim 1, wherein the first end part extends in a first direction parallel to the inner face of the skin of the fuselage and the second end part extends in a second direction perpendicular to the first direction.

10. An aircraft according to claim 9, wherein the third part extends in a direction substantially parallel to the second direction.

11. An aircraft according to claim 9, wherein the second direction corresponds to the axial direction along which the at least one zone of the device is formed to have a reduced resistance under axial compression.

12. An aircraft according to claim 1, wherein the connection device has a general form of an angle-iron interlocking the first frame of the aircraft with the skin of the fuselage.

13. An aircraft according to claim 1, wherein the connection device includes a detection device that detects when the connection device has collapsed due to the impact.

14. An aircraft according to claim 1, wherein the connection device includes a first element that includes the first end part, the second end part, and the third part and the connection device includes a second element that includes a fourth end part in contact with the second end part and a fifth end part in contact with the first end part.

15. An aircraft according to claim 14, wherein the second element collapses and breaks in response to the impact and the first element absorbs energy of the impact.

16. An aircraft according to claim 1, further comprising:
a second frame of the fuselage that extends transverse to the longitudinal direction of the aircraft,
wherein the surrounding zone includes a first zone immediately bordering the door and includes a second zone outward from the first zone, away from the door, and
wherein the second frame is directly attached to the skin in the first zone and the first frame is attached to the skin through the connection device in the second zone.

17. An aircraft according to claim 1,
wherein the first frame includes a middle portion that extends transverse to the longitudinal direction and includes two end portions that each extend from the middle portion in the longitudinal direction, and
wherein the second end part of the connection devices affixed to the middle portion.

18. An aircraft according to claim 17, wherein the second end part of the connection device is substantially parallel to the middle portion.

19. An aircraft according to claim 1, wherein the door is for boarding passengers into the aircraft.

* * * * *